United States Patent [19]

Kawabata et al.

[11] Patent Number: 4,522,480
[45] Date of Patent: Jun. 11, 1985

[54] BATTERY VOLTAGE CHECKING DEVICE FOR CAMERAS

[75] Inventors: Takashi Kawabata, Kanagawa; Nobuhiko Shinoda; Shinji Sakai, both of Tokyo, all of Japan

[73] Assignee: Canon Kabushiki Kaisha, Tokyo, Japan

[21] Appl. No.: 599,210

[22] Filed: Apr. 12, 1984

Related U.S. Application Data

[63] Continuation of Ser. No. 374,527, May 3, 1982, abandoned, which is a continuation of Ser. No. 241,390, Mar. 6, 1981, abandoned.

[30] Foreign Application Priority Data

Mar. 10, 1980 [JP] Japan .................................. 55-30071

[51] Int. Cl.$^3$ .............................................. G03B 17/18
[52] U.S. Cl. .................................... 354/468; 354/484; 354/127.12
[58] Field of Search ..................... 354/60 F, 127, 289, 354/468, 484, 127.12

[56] References Cited

U.S. PATENT DOCUMENTS

| | | | |
|---|---|---|---|
| 4,068,150 | 1/1978 | Iwata et al. | 354/127 |
| 4,131,351 | 12/1978 | Iwata et al. | 354/127 |
| 4,176,933 | 12/1979 | Watanabe | 354/127 |
| 4,290,677 | 9/1981 | Baumeister | 354/127 |
| 4,354,750 | 10/1982 | Hasegawa et al. | 354/418 |

Primary Examiner—Russell E. Adams
Attorney, Agent, or Firm—Toren, McGeady, Stanger

[57] ABSTRACT

A battery checking device for cameras of the type having a booster circuit the output of which is fed as electrical power to a load is disclosed. In the case of the camera of the type described, when the battery voltage is checked at the output of the booster circuit, an accurate checking operation cannot be carried out. The present invention, therefore allows the voltage at the input of the booster circuit to be checked. Since another problem is that the booster circuit, after having been actuated, takes a predetermined time before its operation is stabilized, and the value of voltage as sensed during this time does not provide an accurate representation, the present invention provides that checking of that input voltage begins after the elapse of a predetermined time from the actuation of the booster circuit when the operation of the booster circuit becomes stable. Accordingly, it is made possible to achieve always an accurate and reliable battery checking operation.

15 Claims, 4 Drawing Figures

BATTERY VOLTAGE CHECKING DEVICE FOR CAMERAS

This is a continuation of application Ser. No. 374,527, filed May 3, 1982, which was a continuation of application Ser. No. 241,390, filed Mar. 6, 1981, both now abandoned.

BACKGROUND OF THE INVENTION

1. Field of the Invention:

This invention relates to battery voltage checking devices and more particularly to battery voltage checking devices for cameras having a booster circuit driven by the battery.

2. Description of the Prior Art:

Conventionally, as a method of checking the battery voltage, it is known to provide a method of checking the battery voltage by connecting the output of the battery to a dummy resistor.

On the other hand, in apparatus having a booster circuit for boosting the voltage of the battery and for driving the load by the boosted output thereof, as the battery voltage fluctuates until the output of the booster circuit becomes stable, the mere connection of the dummy resistor to the battery in checking the battery voltage does not lead to high accuracy and reliability in checking of the battery. Another problem of the above-described apparatus is that when the output of the booster circuit is applied to the load driving means before the booster circuit attains stable operation, because of the instability of the boosted output, there is a high possibility of the occurrence of a faulty operation of the load.

SUMMARY OF THE INVENTION

It is an object of the present invention to provide a battery voltage checking device for a camera having a load to be driven by the battery voltage after it is boosted by a booster circuit, which has overcome the above-described drawbacks by the use of a sensing circuit arranged to detect the battery voltage after the booster circuit is stabilized in operation.

Another object of the present invention is to provide a battery voltage checking device which has overcome the above-described drawbacks, by detecting the battery voltage at the input of the booster circuit after a predetermined time from the actuation of the booster circuit.

Still another object of the present invention is to provide a battery voltage checking device cooperating with a faulty operation preventing system in such a manner that when the input voltage to the booster circuit for boosting the battery voltage, as sensed after a predetermined time from the actuation of the booster circuit, is determined to be lower than a predetermined level, the supply of power from the booster circuit is stopped, thus preventing faulty operation due to the loss in the battery voltage.

These and other objects and features of the present invention will become apparent from the following detailed description of an embodiment thereof taken in conjunction with the accompanying drawings in which:

DESCRIPTION OF THE PREFERRED EMBODIMENT

Figure 1:
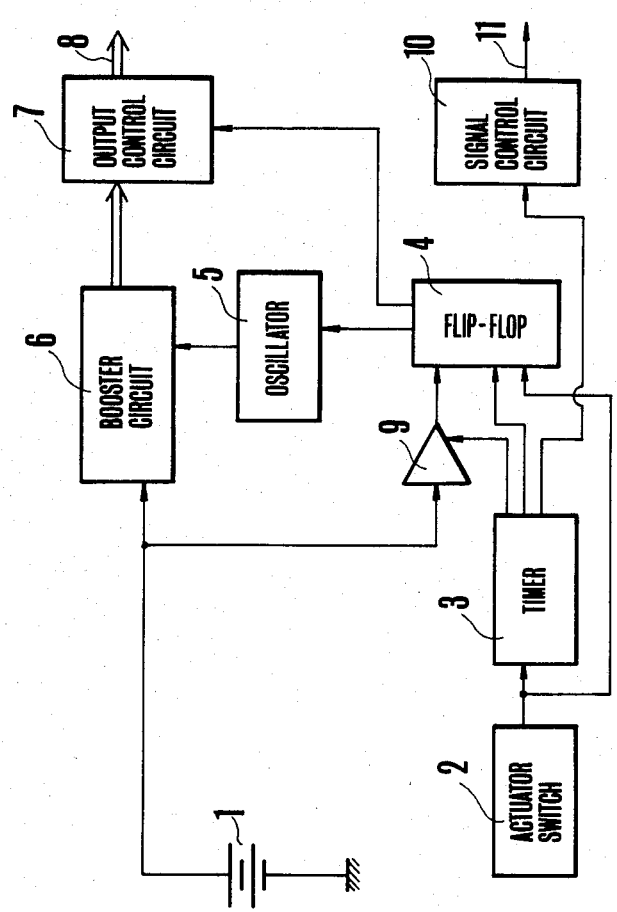
FIG. 1 is a block diagram of an embodiment of a battery voltage checking device according to the present invention.

The present invention is next described in connection with an embodiment of a battery voltage checking device. FIG. 1. shows an electrical power source or battery 1; and an actuator switch 2. When said switch is operated, a flip-flop 4 is set, rendering an oscillator 5 operative. A timer circuit 3 is rendered operative by operating the actuator switch 2. Said circuit produces an output after a predetermined time (necessary for a booster circuit 6 to become stable). The booster circuit 6 such as a DC-DC converter is rendered operative by clock pulses from the oscillator 5. An output control circuit 7 is provided for transmitting the output of the booster circuit 6 to a load output terminal 8, said circuit, responsive to the inverted signal of the above-described flip-flop, lowering the voltage at the output terminal 8. A comparator 9 is rendered operative by the output of the above-described timer circuit to produce an output signal when the battery voltage is below a predetermined level, causing the flip-flop 4 to produce the above-described inverted signal. A signal control circuit 10 is provided for producing a faulty operation preventing signal at a signal control output terminal 11 until the timer circuit produces the output, so that a faulty operation of the load is prevented.

The operation of the device of FIG. 1 is as follows:

When the actuator switch 2 is operated, the flip-flop 4 is set to actuate the oscillator 5. The clock pulses from said oscillator 5 are transmitted to the booster circuit 6 and the booster circuit 6 is rendered operative with the production of a high voltage at the output terminal thereof. On the other hand, the operation of the switch 2 also causes the timer circuit 3 to be rendered operative. Then, in a time necessary to stabilize the operation of the above-described booster circuit, said timer circuit produces an output which is fed to the comparator 9. As the comparator 9 is rendered operative, the level check of the battery voltage at this time point is carried out. Now assuming that the battery voltage is below the predetermined level, then the comparator 9 produces an output signal which is applied to invert the flip-flop 4. By the inverted output signal, the oscillator 5 is rendered inoperative so as to de-actuate the booster circuit 6. Also, at this time, the output control circuit causes the output voltage at the output terminal to drop down, thus stopping the supply of power to the load.

Alternately assuming that the battery voltage is sufficient at a time when the timer circuit 3 produces an output, then the comparator 9 does not produce an output and the flip-flop 4 does not invert. In this case, therefore, the supply of power from the output terminal 8 to the load takes place. It is noted that the output of the timer circuit 3 actuates the signal control circuit 10 so that the faulty operation preventing signal at the output terminal 11 disappears. Thus, the actuation of the load is deferred until the output of the booster circuit is stabilized, and a faulty operation of the load resulting from a fluctuation of the output of the booster circuit 6 is prevented.

It will be appreciated that since the battery voltage checking device according to the present invention checks the level of battery voltage after the output of the booster circuit attains a stable condition, a high accuracy of level checking is always assured.

Figure 2A:
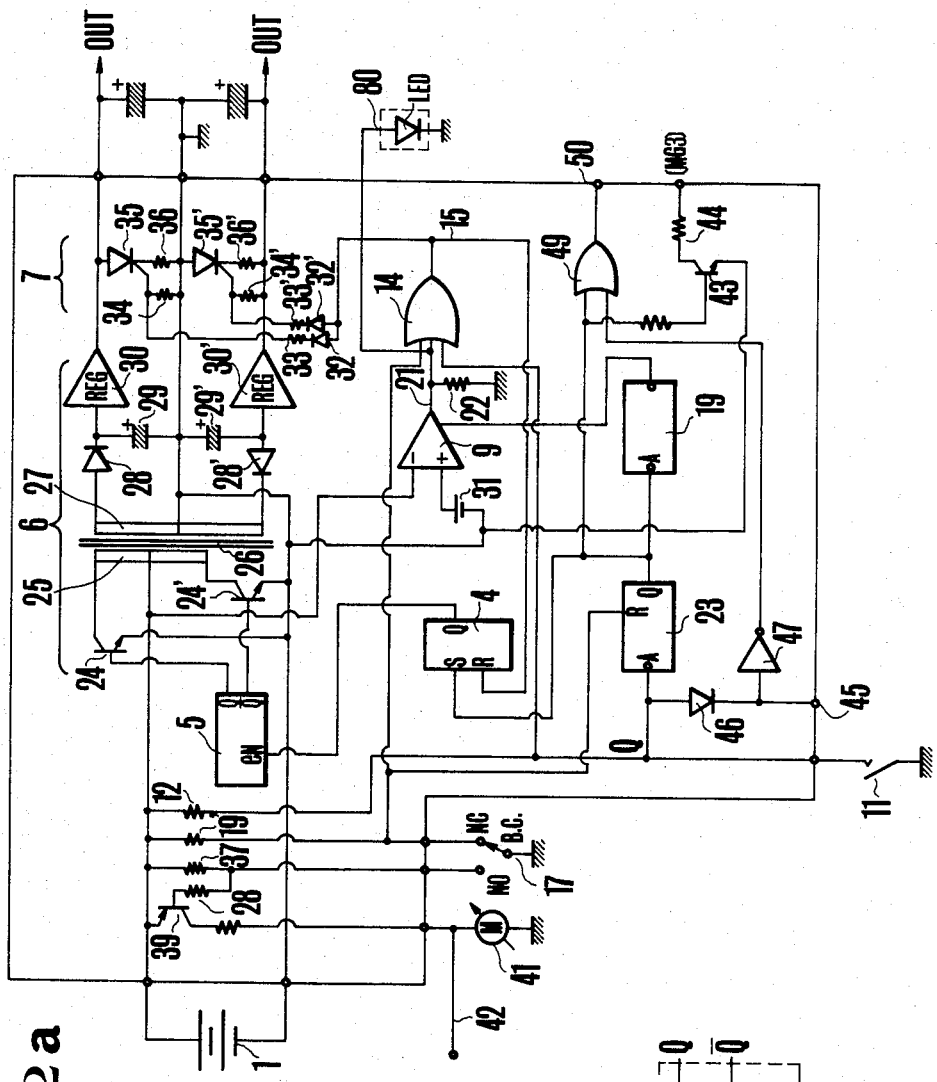
FIG. 2(a) is an electrical circuit diagram showing details of a battery voltage detecting circuit portion.
Figure 2C:
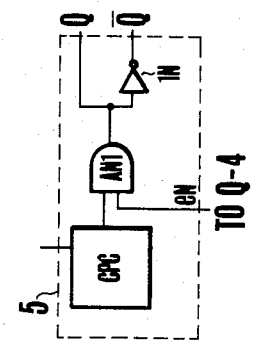
FIG. 2(c) shows the details of the oscillator 5 of FIG. 2(a).
Figure 2B:
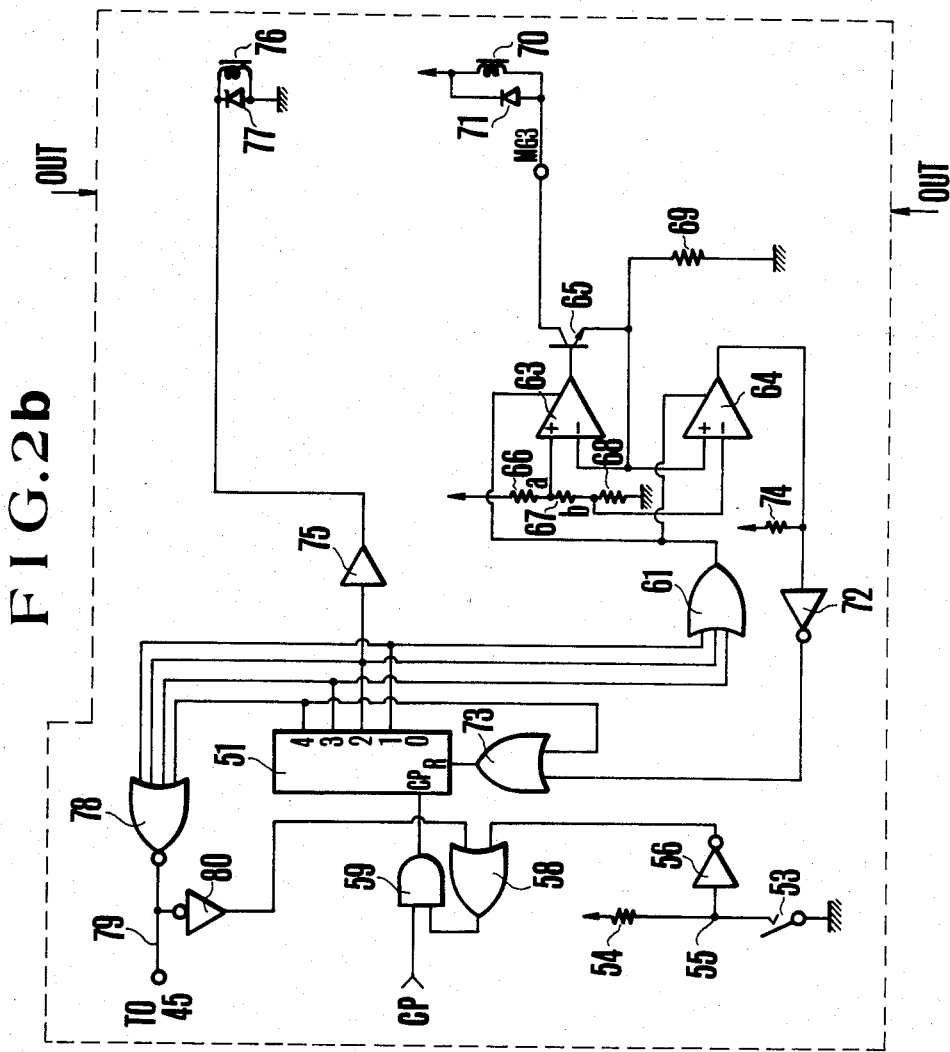
FIG. 2(b) shows an exposure control circuit portion.

FIG. 2 shows an example of an application of the battery voltage checking device to a photographic camera with FIG. 2(a) showing the circuitry of the battery voltage checking section, and FIG. 2(b) showing an exposure control circuit.

FIG. 2(a) shows an electrical power source or battery 1; and a pulse oscillating circuit 5 responsive to a signal of high level (hereinafter referred to as "1" signal) given at an enable terminal eN, for producing "1" signal at output terminals Q and $\overline{Q}$ alternately as it oscillates. A booster circuit 6 (DC-DC converter) is constructed from a transistor 24 with its base connected to the output terminal Q of the oscillator 5, a transistor 24' with its base connected to the output terminal $\overline{Q}$ of the oscillator, a primary coil 25, a magnetic permeator 26, a secondary coil 27, the parts 25 to 27 forming a transformer, rectifier diodes 28 and 28', smoothing condensers 29 and 29' and stabilizing circuits 30 and 30'.

A switch arranged to be turned on when a shutter button (not shown) is depressed to a first stroke. When said switch 11 is turned on, a signal at an input terminal A of a one-shot circuit 23 constituting the timer circuit changes from "1" to low level (hereinafter referred to "0"). Said one-shot circuit 23 produces "1" signal of duration necessary to stabilize the operation of the booster circuit 6 at the output terminal Q thereof. A flip-flop circuit 4 has its "set" terminal S connected to the Q output terminal of the one-shot circuit 23 and has its "reset" terminal R connected to the output terminal of an OR gate 14, the output of said circuit being connected to the enable terminal eN of the pulse oscillator. A one-shot circuit 19 has its input terminal A connected to the Q output terminal of the one-shot circuit 23; A comparator 9 has its (−) input terminal connected to the battery 1 and its (+) input connected to a reference voltage source 31. Said comparator 9, responsive to "1" signal from the output terminal Q of the one-shot circuit, is rendered operative. A OR gate 14 has three inputs which are connected to the output terminal of the above-described comparator 9, an NC contact of a switch 17 and the switch 11 respectively. An output control circuit 7 is constructed from diodes 32 and 32', resistors 33, 33', 34, 34', 36 and 36', and thyristors 35 and 35'. An OR gate 49 has two inputs which are connected to the Q output terminal of the above-described one-shot circuit 23 and an inverter 47 respectively, so that during the time when the one-shot circuit produces an output, that is, until the booster circuit becomes stable, and when an exposure operation is being controlled by a control circuit later to be described, it produces "1" signal. Accordingly a load circuit which has to be maintained in an inoperative position during the exposure, for example, a distance adjusting mechanism, is rendered inoperative. A transistor 43 has its base connected to the Q output terminal of the one-shot circuit 23, and its collector connected through a resistor 44 to a magnet 70 to be described later. A battery check switch 17 normally assumes an NC position and upon operation changes its position to NO. A transistor 39 has its base connected through a resistor 38 to the switch 17 and its collector connected to a meter 41 so that when the switch 17 is moved to an NO position, the battery voltage is displayed by a meter 41. A terminal 42 is provided to which an output signal of a load circuit, for example, a light metering circuit (not shown), is applied. In response to the signal at said terminal, the meter 41 presents a display of the exposure value or the like. It is noted that an indicator circuit 80 is connected to the output of the comparator 9 and has a light-emitting diode LED.

FIG. 2(b), shows a switch 53 arranged to be turned on when the release button is depressed to the second stroke; and an inverter 56. The output of said inverter is supplied as "1" signal through an OR gate 58 to an AND gate 59 at one input thereof. Applied to the other input of said AND gate 59 are clock pulses CP from a pulse oscillator (not shown). A decoded output counter 51 has a clock input terminal CP which is connected to the output terminal of the AND gate 59 and has output stages 0 to 4. An OR gate 61 has three inputs which are connected to the outputs 1 to 3 of the above-described counter 51 and has an output which is connected to operational amplifiers 63 and 64 forming a comparator, so that the operation of the amplifiers 63 and 64 is controlled. The amplifier 63 has a (+) input terminal which is connected to the output terminal, a, of a series-connected circuit of resistors 66, 67 and 68, and has a (−) input terminal which is connected to a resistor 69. A transistor 65 has its base connected to the output of the amplifier 63 and its collector connected through a terminal MG3 to a rear curtain latching magnet 70. A malfunction preventing diode 71 is connected in parallel with the magnet 70. The above-described amplifier 64 has a (+) input terminal which is connected to the above-described resistor 69 and has a (−) input terminal which is connected to the output terminal, b, of the above-described series-connected circuit. The output terminal of the said amplifier 64 is connected to the input terminal of an inverter 72 so that when the output of the amplifier 64 is of "0" signal, it produces "1" signal which is then applied through the OR gate 73 to the "reset" terminal R of the above-described counter 51.

A buffer amplifier 75 is connected to the output terminal 2 of the counter 51 so that the signal from the output terminal 2 of the counter is applied through said amplifier to a magnet 76 for controlling the running down movement of the front curtain of the shutter. A malfunction preventing diode 77 is connected in parallel with the magnet 76. A NOR gate 78 is its inputs connected to the output terminals 1 to 4 of the above-described counter 51 and its output terminal connected to the terminal 45 of FIG. 2(a) so that "0" signal from said gate effects battery holding. An inverter 80 has its output terminal connected to the input terminal of the above-described OR gate 58.

It is noted that the circuit of FIG. 2(b) is supplied with current in the form of the boosted output of FIG. 2(a). It is further noted that the oscillator of FIG. 2(a) is constructed as shown in FIG. 2(c) from a pulse oscillating circuit CPC, an AND gate $AN_1$ and an inverter IN.

In operating the circuit of FIG. 2, when the release button is depressed, the switch 11 of FIG. 2(a) is turned on, thereby the one-shot circuit 23 is rendered operative to produce "1" signal at the output terminal Q. Then, the "1" signal is applied to the "set" terminal S of the flip-flop 4 and said flip-flop 4 produces "1" signal at the output terminal Q. Responsive to this, the AND gate $AN_1$ of FIG. 2(c) is opened to pass the output of the oscillating circuit CPC therethrough. Therefore, the pulse oscillator 5 is rendered operative with the outputs Q and $\overline{Q}$ alternately taking "1" level which causes the DC-DC converter to go on. Thus, the circuit of FIG. 2(b) is supplied with electrical power.

After a predetermined time from the start of operation of the DC-DC converter, that is, after the operation of the DC-DC converter has reached a stable condition, the one-shot circuit 23 changes its output from "1" to "0" at which the one-shot 19 produces "1" signal of predetermined duration. Then, the comparator 9 is rendered operative to compare the voltage of the battery 1 with the voltage of the reference voltage source 31.

Now assuming that the battery voltage is lower than the reference voltage, then the comparator 9 produces "1" signal which is applied to reset the flip-flop 4. Therefore, the pulse oscillator 5 is rendered inoperative which in turn renders the DC-DC converter inoperative. Also the "1" signal produced through the OR gate 14 is applied through the diodes 32 and 32' and resistors 33, 33', 34 and 34' to the gates of the thyristors 35 and 35', thereby said thyristors 35 and 35' are turned on. Thus, the DC-DC converter no longer produces the output and the current supply to the circuit of FIG. 2(b) is stopped.

Also the output of the one-shot circuit 23 is applied through the OR gate 49 to the output terminal 50 and is taken out of it. Therefore, during the time when the output of the one-shot 23 is "1", that is, during the time when the DC-DC converter is not stabilized yet, the "1" signal from the terminal 50 functions to prevent actuation of the distance adjusting mechanism or like load circuit, thus assuring that a faulty operation due to the instability of the output of the DC-DC converter is prevented.

On the other hand, the "1" signal of the one-shot circuit 23 is also applied to the base of the transistor 43. As the transistor 43 is turned on, the magnet 70 is brought into connection with the resistor 44 and transistor 43 through the terminal MG3 and is supplied with current. As a result, the DC-DC converter works with the load applied thereon. This leads to represent the voltage of the battery 1 as that which results in driving the load. Thus, it is made possible to check the actual voltage of the battery with high accuracy. It should be pointed out that in the case, the indicator circuit 80 informs the operator of the fact that the battery voltage is below the satisfactory operating level.

Alternately assuming that the battery voltage is higher than the reference voltage, then the comparator 9 continues producing "0" signal. Therefore, the flip-flop 4 is not reset, permitting the pulse oscillator 5 to be maintained in the operative position. And the thyristors 35 and 35' are held in the non-conducting state. Therefore, the DC-DC converter continues producing the boosted output.

Then, when the release button is further depressed, the switch 53 is turned on. As the inverter 56 produces "1" signal, the AND gate 59 is opened to pass the pulses CP therethrough to the counter 51. When a predetermined number of pulses CP has been counted, the counter 51 produces "1" signal at the output terminal 1 thereof. This signal is routed to the OR gate 61 and therefrom to the amplifiers 63 and 64. As the amplifiers 63 and 64 are rendered operative, the transistor 65 is turned on to energize the magnet 70, thereby the trailing curtain of the shutter is latched. If it occurs at this time that the coil of the magnet 70 is broken at a point, the potential at the (+) input of the amplifier 64 is lowered and the amplifier 64 produces "1" signal which is then applied to reset the counter 51. Thus, accidental occurrence of a damage such as the breakage of the coil results in not initiating the exposure operation and preventing faulty operation.

Also the "1" signal from the output terminal 1 of the counter 51 is routed to the NOR gate 78 which in turn produces "0" signal. This signal is fed to the terminal 45 of FIG. 2(a) so that the potential at Q point is maintained at "0" regardless of whether the switch 11 is ON or OFF. Thus, the battery circuit is latched.

The "0" signal from the NOR gate 78, after having been inverted by the inverter 80 to "1", is also applied to the AND gate 59 through the OR gate 58, thereby the AND gate 59 is maintained open regardless of whether or not the switch 53 is open. Again, as has been mentioned above, the "1" signal from the output terminal 1 of the counter 51 is given as "0" signal to the terminal 45. Therefore, "1" signal from the inverter 47 is applied to the OR gate 49. Thus, the other load circuit portions than those which contribute to making an exposure, such as the focusing control mechanism, are prevented from operating likewise as in the unstable state of the DC-DC converter. Therefore, the focusing control mechanism takes an operative position during a time from the moment at which the DC-DC converter has been stabilized to the moment at which an exposure sequence operation is initiated, and terminates its operation before the initiation of an exposure.

After that, as the counting operation of the counter 51 proceeds, when the output at the terminal 2 of the counter 51 changes to "1", the magnet 76 is energized to release the leading curtain of the shutter from the latching connection. After an exposure is initiated, as the counter 51 further advances a number of counts, the output at the terminal 3 of the counter 51 changes to "1". Since said output terminal 3 is connected only to the input terminals of the OR gate 61 and NOR gate 78, the exposure control is not affected and the exposure continues advancing. After that, a further advancement of the counting of the counter 51 results in the production of "1" signal at the output terminal 4. Since at this time the other output terminals 0 to 3 produce "0" signals, the output of the OR gate 61 is changed to "0" signal by which the amplifier 63 is rendered inoperative. Then, the transistor 65 is turned off to deenergize the magnet 70. Then, the trailing curtain of the shutter runs down to terminate the exposure.

The "1" signal from the output terminal 4 of the counter 51 is routed through the OR gate 73 to the "reset" terminal of the counter 51. As the counter 51 is reset, all the outputs from the counter 51 take "0" and the NOR gate 78 then produces "1" signal. It is therefore at the terminal 45 that the "0" signal as the latching signal is changed to "1" signal, thereby the latching operation is released. Also the "1" signal from the NOR gate 78 after having been inverted by the inverter 80 to "0" signal is applied through the OR gate 58 to the AND gate 59. Thus, the maintenance of opening of the AND gate 59 is terminated. If at this time the switch 53 is open because of the release of the shutter button from depression, the OR gate 14 then produces "1" signal by which the flip-flop 4 is reset and the pulse oscillator is rendered operative. Then, the DC-DC converter is rendered operative. While the thyristors 35 and 35' are turned on, the boosted output of the DC-DC converter disappears, thus completing all exposure sequence.

Next, explanation is given to the case where the release button is depressed through the first and second strokes almost simultaneously.

In this case also, the turning on of the switch 11 renders the DC-DC converter operative and the turning on of the switch 53 causes opening of the AND gate 59 with the result that the counter 51 starts to count. But, as has been described above, since the one-shot circuit 23 produces "1" signal until the output of the DC-DC converter is stabilized, and this leads to maintain the transistor 43 in the conducting state, when the amplifier 64 is rendered operative by the "1" signal from the output terminal 1 of the counter 51, the counter 51 is reset and stopped from counting operation until the output of the DC-DC converter becomes stable. Thus, a faulty operation is prevented from occurring. In more detail, when the transistor 43 is turned on as has been mentioned above, the magnet 70 is connected to the resistor 44 and the transistor 43 so that the potential at the (+) input terminal of the amplifier 64 is lowered, and the amplifier 64 produces "0" signal. Then, "1" signal is produced through the inverter 72 and is applied through the OR gate 73 to the "reset" terminal R of the counter 51. Thus, the counter 51 is maintained reset. Therefore, when the output of the one-shot circuit 23 changes from "1" to "0", that is, until the output of the DC-DC converter becomes stable, the counter 51 does not start to count. After the DC-DC converter has been stabilized, the counter 51 starts to count. Thus, an exposure operation with the unstable DC-DC converter is prevented from happening. It is to be understood that this case is different from the preceding case only in that the initiation of a counting operation of the counter 51 is deferred pending the attainment of the stable condition of the DC-DC converter, and the other point is exactly the same as in the above.

It is noted that when the switch 17 is moved from NC to NO position, the dummy resistor 37 is fed with current from the battery 1, and the conduction of the transistor 39 is controlled in accordance with the battery voltage. Therefore, the battery voltage is displayed by the meter 41. Such movement of the switch 17 to NO position also causes the OR gate 14 to produce "1" signal by which the DC-DC converter is rendered inoperative as has been mentioned above.

It is further noted that though the above-described embodiment performs a checking of the battery voltage after the booster circuit has attained a stable condition, it is also possible to otherwise check the battery voltage in such a manner that while the comparator 9 of FIG. 2(a) is caused to operate until the boosted voltage starts to be stationary, the voltage drop of the battery 1 by the inrush current after the start of boosting the voltage is sensed.

As has been described in great detail, in the battery voltage checking device according to the present invention, the comparator is rendered inoperative until the booster circuit becomes stable. Another feature is that after the operation of the booster circuit has been stabilized, the checking of the battery voltage is carried out and the application of the boosted output to the load driving means is hindered until the booster circuit is stabilized. Therefore, the present invention has the advantages that an accurate and reliable checking operation of the battery voltage can be always assured, and that an accidental faulty operation of the load can be prevented.

What is claimed is:

1. A battery voltage checking device for a camera including:
    (a) a booster circuit having an input and an output for increasing a voltage applied to the input when said booster circuit is actuated;
    (b) connect means for transmitting an output voltage of a battery to the input of said booster circuit;
    (c) a load circuit arranged to be supplied with electrical power by the voltage at the output of said booster circuit;
    (d) a sensing circuit for sensing the voltage level of the battery and for providing a sensed output; and
    (e) a control circuit for allowing the sensed output of said sensing circuit to be processed after a predetermined time from the actuation of said booster circuit.

2. A battery voltage checking device for a camera including:
    (a) a booster circuit having an input and an output for increasing a voltage applied to the input and providing the increased voltage at the output when said booster circuit is actuated;
    (b) connect means for transmitting an output voltage of a battery to the input of said booster circuit;
    (c) a load circuit arranged to be supplied with electrical power by the voltage at the output of said booster circuit;
    (d) a sensing circuit for sensing the voltage level of the battery; and
    (e) a control circuit for rendering said sensing circuit operative after a predetermined time from the actuation of said booster circuit.

3. A battery voltage checking device for a camera including:
    (a) an actuator member;
    (b) a booster circuit having an input and an output for increasing a voltage applied to the input by operation of said actuator member;
    (c) connect means for transmitting an output voltage of a battery to the input of said booster circuit;
    (d) a load circuit arranged to be supplied with electrical power by the voltage at the output of said booster circuit;
    (e) a sensing circuit for sensing the voltage level of the battery;
    (f) a timer circuit arranged to produce a timing signal a predetermined time after operation of said actuator member; and
    (g) control means responsive to the timing signal of said timer circuit for rendering operative said sensing circuit.

4. A battery voltage checking device for a camera including:
    (a) an actuator member;
    (b) a booster circuit having an input and an output for increasing a voltage applied to the input by operation of said actuator member;
    (c) connect means for transmitting an output voltage of a battery to the input of said booster circuit;
    (d) a load circuit arranged to be supplied with electrical power by the voltage at the output of said booster circuit;
    (e) a sensing circuit for sensing the voltage level of the battery and for providing a sensed output;
    (f) a timer circuit arranged to produce a timing signal a predetermined time after operation of said actuator member; and (g) enabling means responsive to the timing signal from said timer circuit for allowing the sensed output of said sensing circuit to be processed.

5. A battery voltage checking device for a camera according to claim 1 or 2 or 3 or 4, wherein said sensing circuit produces a first output signal when the voltage at the output of the booster circuit is above a predetermined value, and a second output signal when the input voltage is below the predetermined value, and including an indicator circuit responsive to the output signal of the sensing circuit for indicating the voltage condition.

6. A battery voltage checking device for a camera according to claim 1 or 2 or 3 or 4, wherein said sensing circuit produces an inhibit output when the voltage of the battery is below a predetermined value, and said booster circuit includes an oscillator for carrying out a voltage boosting operation, said oscillator being rendered inoperative in response to the inhibit output of said sensing circuit.

7. A battery voltage checking device for a camera according to claim 1 or 2 or 3 or 4, wherein said sensing circuit produces an inhibit output when the voltage of the battery is below a predetermined value, and including output control means for causing the voltage at the output of the booster circuit to be dropped, said output control means being actuated in response to the output of said sensing circuit.

8. A battery voltage checking device for a camera including:
(a) a booster circuit having an input and output, a battery being connected to the input of said booster circuit;
(b) a load circuit arranged to be supplied with electrical power from the output of said booster circuit;
(c) a sensing circuit for sensing the voltage level of the battery and for providing a sensed output; and
(d) control means for enabling the sensed output of said sensing circuit after a predetermined time from an actuation of said booster circuit.

9. A battery voltage checking device for a camera including:
(a) a booster circuit having an input and output, a battery being connected to the input of said booster circuit;
(b) a load circuit arranged to be supplied with electrical power from the output of said booster circuit;
(c) a sensing circuit for sensing the voltage level of the battery and for providing a sensed output; and
(d) control means for rendering said sensing circuit operative after a predetermined time from an actuation of said booster circuit.

10. A battery voltage checking device for a camera including:
(a) a booster circuit having an input and output, a battery being connected to the input of said booster circuit;
(b) a load circuit arranged to be supplied with electrical power from the output of said booster circuit;
(c) a sensing circuit for sensing the voltage level of the battery and for providing a sensed output; and
(d) an indicator for indicating a condition of battery voltage on the basis of sensed output; and
(e) control means for enabling an operation of indicator after a predetermined time from an actuation of said booster circuit.

11. A battery voltage checking device according to claim 1, 2, 8, 9 or 10, wherein said predetermined time by said control means corresponds to a time necessary for said booster circuit to become stable as measured from the start of operation thereof.

12. A battery voltage checking device according to claim 3 or 4, wherein the predetermined time until the timing signal is produced from said timer circuit corresponds to a time necessary for said booster circuit to reach a stable operation as measured from the start of operation thereof.

13. A battery voltage checking device according to claim 1, 2, 3, 4, 8, 9 or 10, wherein said sensing circuit produces an inhibit output when the voltage of battery is below a predetermined value, and including output control means for causing the voltage at the output of the booster circuit to be inhibited, said output control means being actuated in response to the output of said sensing circuit.

14. A faulty operation preventing device for a camera, including:
(a) a power source circuit;
(b) a power source switch;
(c) a load circuit for performing photographic operations arranged to be driven by an output of said power source circuit when said power source switch is thrown;
(d) a timer arranged upon throwing of said power switch to start an operation and upon termination of duration of a time necessary for the output of said power source circuit to become stable to produce a timing signal; and
(e) control means responsive to the timing signal from said timer for allowing said load circuit to be driven.

15. A faulty operation preventing device for a camera, including:
(a) a booster circuit for increasing a voltage of a battery;
(b) a power source switch for connection of said battery to said booster circuit;
(c) a load circuit to be driven by an output of said booster circuit;
(d) control means for allowing said load circuit to be driven in a predetermined time after said power source switch has been thrown.

* * * * *